United States Patent [19]
Markey

[11] 3,788,131
[45] Jan. 29, 1974

[54] PEDAL TRAVEL MEASURING TOOL
[75] Inventor: Francis J. Markey, Lewisburg, Ohio
[73] Assignee: General Motors Corporation, Detroit, Mich.
[22] Filed: Jan. 22, 1973
[21] Appl. No.: 325,512

[52] U.S. Cl. ............................................... 73/132
[51] Int. Cl. ............................................. G01l 5/32
[58] Field of Search ......................... 73/132, 141 R

[56] References Cited
UNITED STATES PATENTS
3,602,043  8/1971  Markey ................................ 73/132

Primary Examiner—Jerry W. Myracle
Attorney, Agent, or Firm—D. D. Mc Graw et al.

[57] ABSTRACT

A brake system inspection tool which measures the travel of a vehicle brake pedal during application of a specified pedal force. The tool includes a tubular frame assembly which is clamped to the brake pedal and a rod which is slidable relative to the tubular frame assembly and extends into engagement of the vehicle floor. A tube is located within the tubular frame assembly, surrounds the rod, and has a circular dial mounted on the end thereof. A pin carried on the rod extends laterally thereof through a helical slot in the tube and a straight slot in the tubular frame assembly to impart rotary movement to the tube and dial upon movement of the tubular frame assembly relative to the rod and vehicle floor as the brake pedal is forcibly pivoted to actuate the brakes. The brake apply force is applied against a force sensitive switch mounted on the frame assembly. The force sensitive switch is closed by a predetermined force applied thereagainst to signal the tool operator that the dial should be read.

3 Claims, 7 Drawing Figures

PATENTED JAN 29 1974 3,788,131

PEDAL TRAVEL MEASURING TOOL

The invention relates to a mechanism for inspecting a motor vehicle pedal actuated system and more particularly pedal actuated brake systems.

The present invention is an improvement over my pedal travel measuring tool of U.S. Pat. No. 3,602,043. In my previous patent I disclosed a brake pedal travel measuring tool featuring a travel indicating assembly including a scale tube having a linear displacement scale marked thereon which remained stationary while the other elements of the tool advanced as the brake pedal was rotated so that the linear scale indicated the extent of movement of the brake pedal toward the vehicle floor. The invention also featured a force indicating assembly including a switch actuating tube mounted axially slidably on the tool and having an attached foot plate seated upon a pair of compression springs which were compressed during operator application of force to the brake pedal to move the switch actuating tube axially on the frame assembly and actuate an electrical switch.

One feature of the present invention is a pedal travel measuring tool having improved readability by virtue of a circular dial which is rotated relative to the tool in proportion to the extent of movement of the brake pedal.

Another feature of the present invention is an improved force sensing device including a force sensitive switch mounted on the tool for direct actuation by the foot of the tool operator to energize an electrical signal device.

The invention comprises a portable manually operable brake pedal travel measuring tool including a frame assembly, a clamping assembly, a travel indicating assembly, and a force indicating assembly. The frame assembly has a tubular frame member and the clamping assembly has a tubular member which is axially slidable on the tubular frame member of the frame assembly. An upper jaw mounted on the tubular member of the clamping assembly is aligned with a lower jaw mounted on the tubular frame member. A clamping spring urges the upper jaw against the lower jaw. Actuation of a hand lever mounted on the frame assembly overcomes the clamping spring, separating the upper and lower jaws so that they can be located on opposing sides of the brake pedal. Upon release of the hand lever the clamping spring urges the upper jaw toward the lower jaw thereby securely clamping the tool to the brake pedal.

The travel indicating assembly includes a tube mounted for rotation within the tubular frame member and a rod mounted for axial movement within the tube. A pin carried on the rod extends laterally therefrom through a helical slot in the tube and a longitudinally extending slot in the tubular frame member. The operator slides the rod into the frame assembly until it engages the vehicle floor. A circular dial mounted on the end of the tube by a friction detent is rotated on the tube until its zero is aligned with an index mounted on the frame assembly. Upon application of brake actuating force the rod remains stationary while the tubular frame member of the frame assembly and the tube of the travel indicating assembly move with the pedal toward the vehicle floor. The pin rides up the helical slot causing the tube and the circular dial to rotate. A scale on the circular dial indicates the amount of travel of the pedal in relation to the stationary rod.

A force indicating assembly provides a means of indicating to the operator that the proper test force has been applied and that the dial should be read. A force sensitive electrical switch is mounted on the upper jaw of the clamping assembly and includes a pad upon which the operator places his foot to actuate the brake pedal. The force sensitive switch is closed by the specified test force and completes an electrical circuit which energizes a signal lamp.

Figure 1:
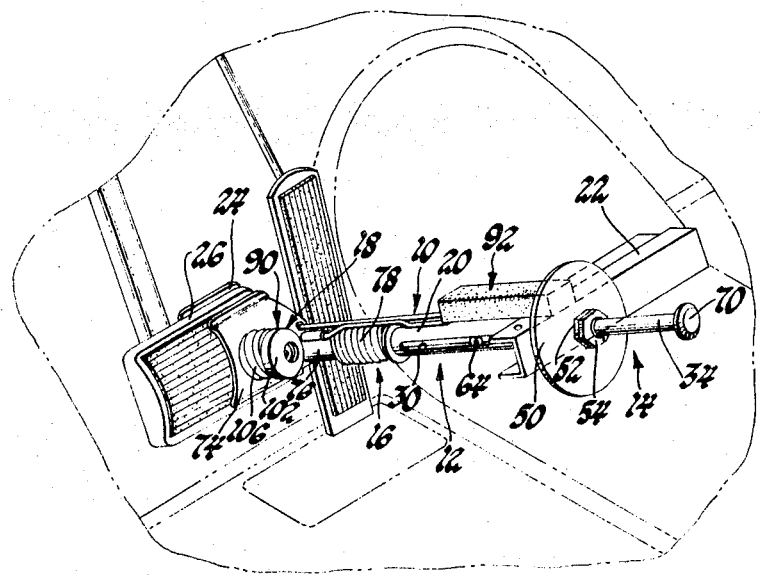
FIG. 1 is a cut-away view of the vehicle showing the brake pedal travel measuring tool clamped to the brake pedal.

The brake pedal travel measuring tool 10 includes a frame assembly 12, travel indicating assembly 14, a clamping assembly 16 and a force indicating assembly 18.

Figure 2:
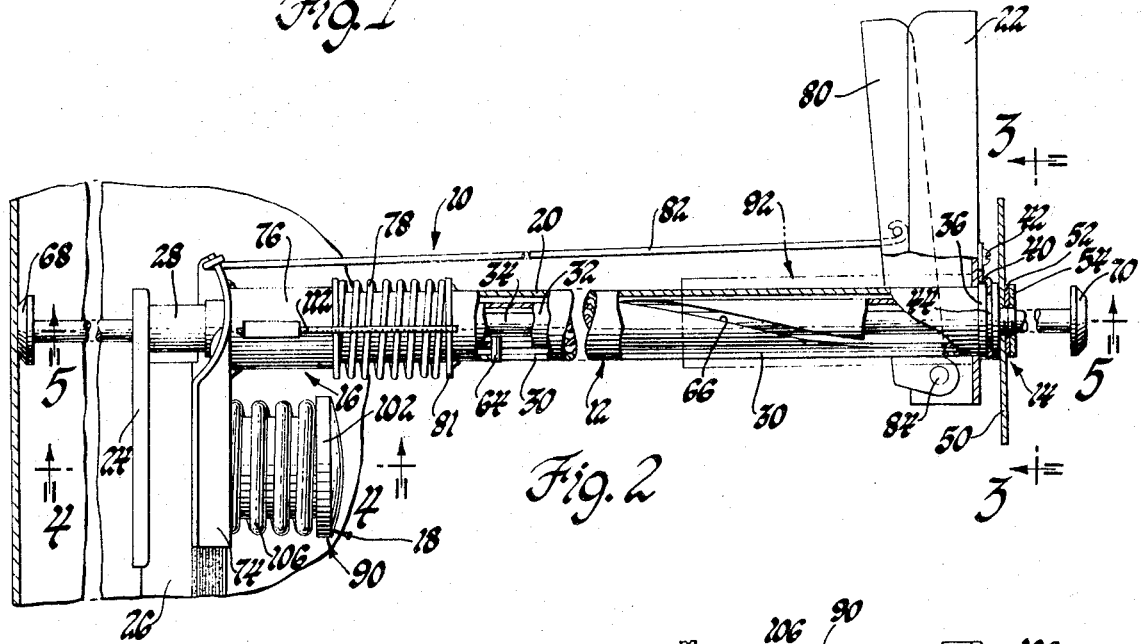
FIG. 2 is a section through the vehicle showing the brake pedal travel measuring tool of FIG. 1 clamped to the brake pedal.
Figure 5:
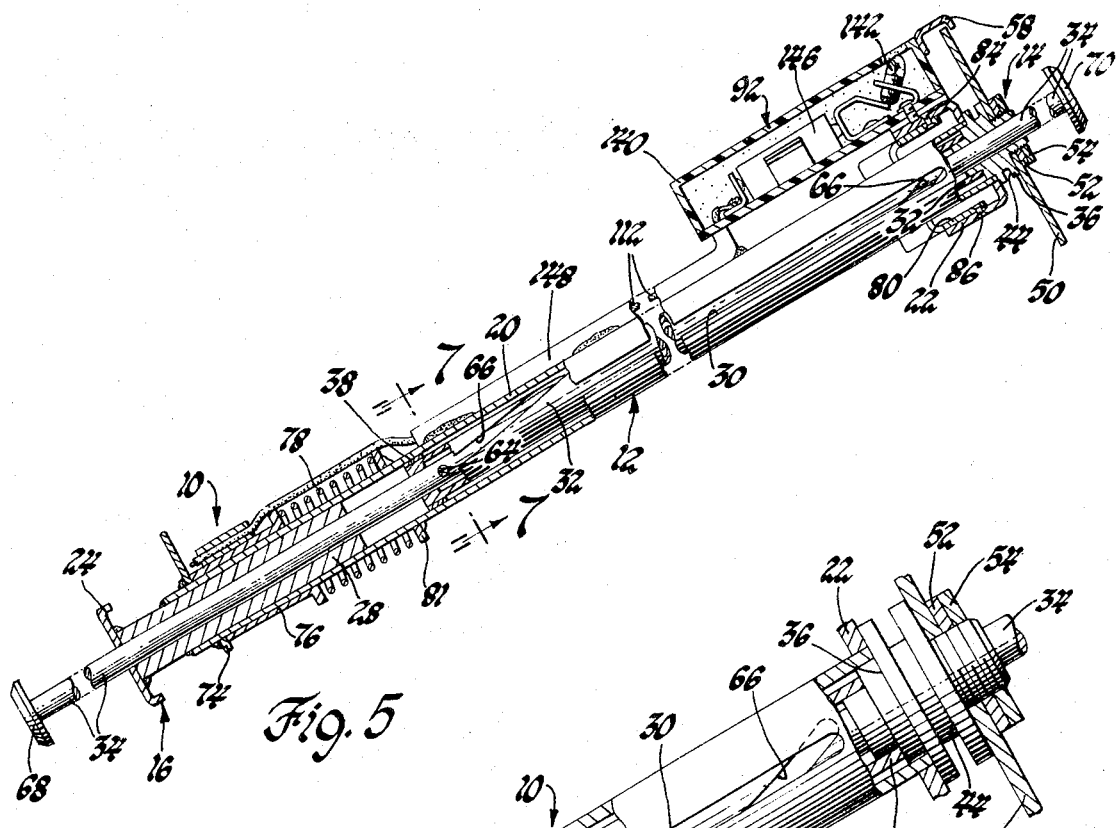
FIG. 5 is a sectional view taken in the direction of arrows 5—5 of FIG. 2.
Figure 6:
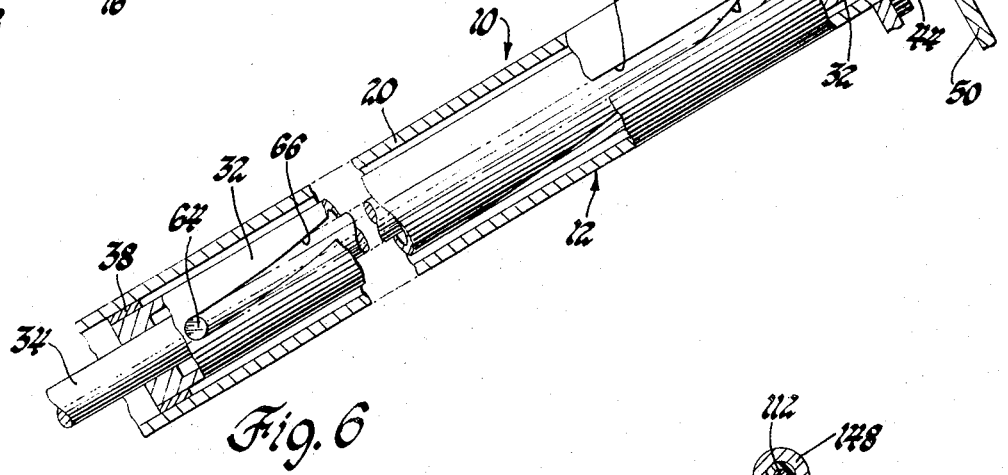
FIG. 6 is an enlarged fragmentary view of FIG. 5.

Referring to FIGS. 2 and 5, the frame assembly 12 includes a tubular frame member 20, handle 22, lower jaw 24, and sleeve 28. The tubular frame member 20 serves as the chassis member of the device. Handle 22 is attached to the upper end of tubular frame member 20. Lower jaw 24 is shaped to conform to the backside of the brake pedal 26 and is mounted on sleeve 28 which is inserted into the lower end of tubular frame member 20 and attached as by welding. The tubular frame member 20 has a longitudinally extending straight slot 30.

Figure 3:
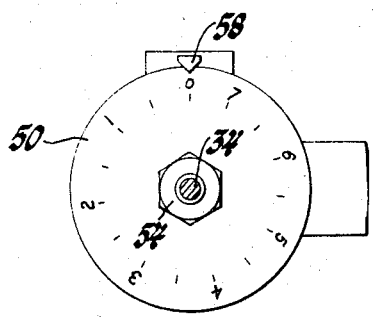
FIG. 3 is an end view in the directions of arrows 3—3 of FIG. 2.
Figure 4:
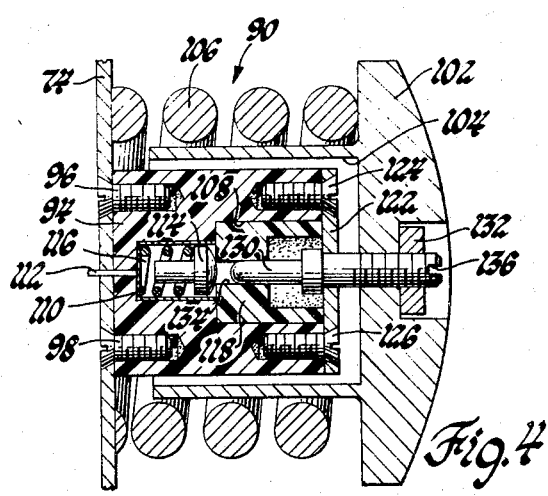
FIG. 4 is a sectional view of the force sensitive switch taken in the direction of arrows 4—4 of FIG. 2.
Figure 7:
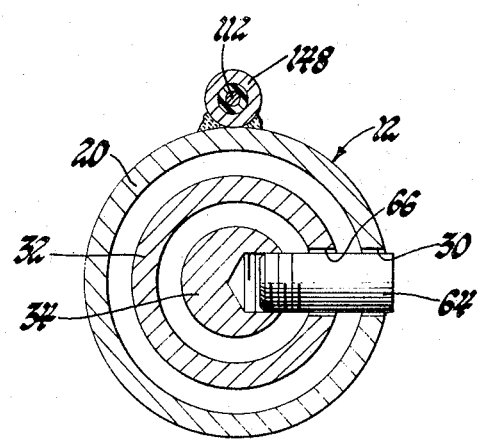
FIG. 7 is a cross sectional view taken in the directions of arrows 7—7 of FIG. 5.

The travel indicating assembly 14 includes a tube 32, rod 34, and a collar 36 and dial 50. Tube 32 is rotatably mounted within the tubular frame member 20 by collar 36 and a bushing 38. Collar 36 is press fit into the upper end of tube 32 so as to rotate therewith in the tubular frame member 20. A retainer clip 40 is attached to the handle 22 by a screw 42 and rides in a groove 44 in collar 36 to retain the collar 36 and tube 32 in a fixed axial position within the tubular frame member 20. A circular dial 50, as best seen in FIG. 3, is attached to a threaded portion of collar 36 by nuts 52 and 54 and has a graduated scale marked on its face. The nuts 52 and 54 are adjusted to clutch the dial 50 to a degree whice causes the dial 50 to rotate with the collar 36 and tube 32 upon rotation of the tube 32 and yet permit the tool operator to grasp and turn the circular dial 50 relative the collar 36, so as to align the zero point on the dial scale with a pointer 58 mounted on the frame assembly. The rod 34 is mounted concentrically within the tube 32 by collar 36 and within the tubular frame member 20 by sleeve 28. A pin 64 is threaded into rod 34, as best seen in FIG. 7, and extends laterally therefrom through a helical slot 66 in the tube 32 and the straight slot 30 of the tubular frame member 20. Thus it will be apparent that as the rod 34 and pin 64 are moved axially relative tubular frame member 20, the pin 64 rides up the helical slot 66 imparting rotary movement to the tube 32, the collar 36 and the dial 50. Rod 34 has knobs 68 and 70 on its respective ends.

The clamping assembly 16, best seen in FIG. 2, includes an upper jaw 74 clamping tube 76, clamping spring 78, hand lever 80 and a clamping rod 82. Upper jaw 74 is mounted on the lower end of clamping tube 76 which is axially slidable on tubular frame member 20. The clamping spring 78 is seated against spring seat 81 attached to the tubular frame member 20 and acts against clamping tube 76 to urge upper jaw 74 toward lower jaw 24. Hand lever 80 is pivotally attached to handle 22 by rivets 84 and 86 and is connected by clamping rod 82 to upper jaw 74. Force applied to the hand lever 80 overcomes the clamping spring 78 and thereby moves upper jaw 78 away from lower jaw 24.

Force indicating assembly 18 includes a force sensitive switch 90 and an electrical signaling device 92. Force sensitive switch 90 includes a cylindrical base 94 of electrically insulative material which is attached to the upper jaw 74 by screws 96 and 98. A foot pad 102 has a cylindrical recess 104 which permits it to be fitted over the base 94. A compression spring 106 acts between the upper jaw 74 and the foot pad 102. The base 94 has a stepped bore 108 in which a cup-shaped contact 110 is located. An electrical conductor 112 is suitably connected to the cup-shaped contact 110. A contact 114 is slidably movable within the cup-shaped contact 110 and is urged by a spring 116 into engagement of an electrically insulating insert 118 which is held in the stepped bore 108 by a retaining plate 122 attached to the base 94 by screws 124 and 126. A contact pin 130 is threaded into foot pad 102 and locked in position relative thereto by a lock nut 132. The contact pin 130 is slidable through a bore 134 of the electrically insulative insert 118 to contact the movable contact 114 and thereby close the switch. The switch is closed when a predetermined force applied to the foot pad 102 causes sufficient compression of compression spring 106 to bring contact pin 130 into engagement of contact 114. Contact pin 130 has a slot 136 which permits it to be adjusted relative foot pad 102 when lock nut 132 is loosened to thereby adjust the magnitude of the force needed to close the switch.

The electrical signal device 92, best seen in FIG. 5, is located within a housing 140. A lamp 142 is mounted so as to shine through a hole in the switch housing. An electrical conductor 112 connects the force sensitive switch with a battery 146 which provides current for the lamp 142 when the switch is closed. The conductor 112 is preferably protected from damage by a conduit 148.

OPERATION

The tool operator enters the vehicle with the brake pedal travel measuring tool and by applying pressure to hand lever 80 causes the clamp assembly 16 to move axially on the frame assembly 12 and thereby move upper jaw 74 away from lower jaw 24. The tool assembly is then maneuvered so that the lower jaw 24 and the upper jaw 74 are on opposing sides of the brake pedal 26. Hand lever 80 is then released and clamping spring 78 acts to urge the clamping assembly 16 to its rest position with the brake pedal 26 securely clamped between lower jaw 24 and the upper jaw 74. Rod 34 is then pushed into the tool assembly so that the knob 68 abuts the vehicle floor. The tool operator then grasps the circular dial 50 and rotates it until the zero on the graduated scale is aligned with the pointer 58. The operator then applies force against the foot pad 102 of the force sensitive switch 90 with his foot. As the brake pedal 26 travels in its arcuate path about its pivot point, the rod 34 remains stationary while the other elements of the brake pedal travel measuring tool move axially downwardly in relation to the stationary rod 34. The pin 64 moves up the straight slot 30 of the tubular frame member 20 during such relative movement and imparts rotary movement to the tube 32 and the dial 50. The operator continues to apply force to the foot pad 102 causing compression of the compression spring 106. Upon application of the predetermined force, the contact pin 130 engages the movable contact 114, thereby completing an electrical circuit which energizes lamp 142 to signal the operator that the specified test force has been applied. The operator then reads the scale on the circular dial 50 to determine the total pedal travel during application of the specified force to the brake pedal. The operator compares the measured travel with the manufacturer's specification for the particular brake system.

If the operator continues to apply force after the signal circuit has been completed, the spring 116 compresses allowing the foot pad 102 to move further relative the base 94, thereby preventing damage to the force sensitive switch.

The tool can be easily calibrated to provide the specified force by loosening the lock nut 132 and adjusting the contact pin 130 with a screwdriver engaged in slot 136.

Thus, a portable manually operable brake pedal travel measuring tool is provided having improved readability and an improved force sensing device.

What is claimed is:

1. A tool for measuring the travel of a brake pedal comprising, a frame assembly, means for clamping the frame assembly to a vehicle brake pedal, a tube mounted in the frame assembly and being rotationally movable therein, a rod mounted in the tube and axially slidable in relation to the tube for movement into engagement with the vehicle floor, means for imparting rotary movement to the tube in proportion to brake applying movement of the brake pedal and the frame assembly relative to the vehicle floor and the rod in engagement therewith, a dial mounted on the tubular member for rotation therewith and having a scale thereon, and force indicating means actuable by a specified force applied to the brake pedal to signal the tool operator to terminate the application of braking force and to read the dial.

2. A tool for measuring the travel of a brake pedal comprising, a tubular frame assembly having a longitudinally extending slot and a lower jaw, a clamping assembly mounted on and axially slidable in relation to the frame assembly and having an upper jaw, spring means biasing the upper jaw toward the lower jaw to clamp the brake pedal travel measuring tool to a vehicle brake pedal, a tube having a helical slot and being located within the tubular frame assembly for rotational movement, a rod mounted in the tube and axially slidable in relation to the tube for movement into engagement with the vehicle floor, means carried on the rod and extending laterally through the slots to impart rotary movement to the tube in proportion to brake applying movement of the brake pedal and the frame assembly relative the vehicle floor, a dial mounted on the tubular member for rotation therewith and having a scale thereon, and force indicating means actuable by a specified force applied to the brake pedal to signal the tool operator to terminate the application of braking force and to read the dial.

3. A tool for measuring the travel of a brake pedal comprising, a frame assembly, means for clamping the frame assembly to a vehicle brake pedal, a tube mounted in the frame assembly and being rotationally movable therein, a rod mounted in and axially slidable in relation to the tube for movement into engagement with the vehicle floor, means for holding the rod rotationally stationary and imparting rotary movement to the tube in proportion to brake applying movement of the brake pedal and the frame assembly relative the vehicle floor and the rod in engagement therewith, a circular dial having a scale thereon, friction detent means mounting the dial on the tube and permitting forced rotary movement of the dial relative the tube, a force sensitive switch mounted on the tool and having an integral foot pad for directly receiving the brake apply force, and an electrical signaling circuit being completed upon closure of the force sensitive switch upon application of a predetermined force to signal the tool operator to terminate the application of braking force and to read the dial.

* * * * *